J. W. WOOLF.
MOLD FOR PLASTIC MATERIAL.
APPLICATION FILED AUG. 1, 1910.
1,049,436.
Patented Jan. 7, 1913.
3 SHEETS—SHEET 1.
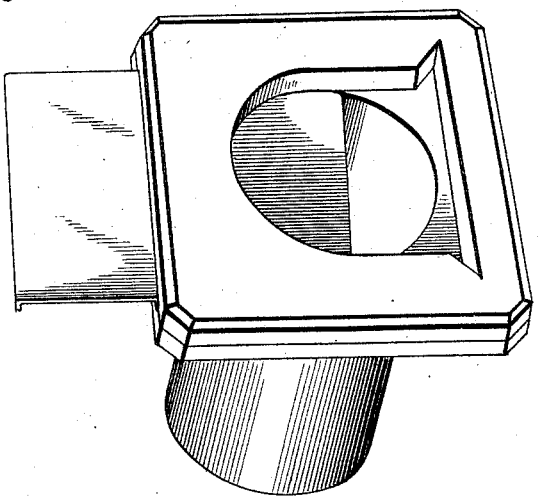
Fig. 10.
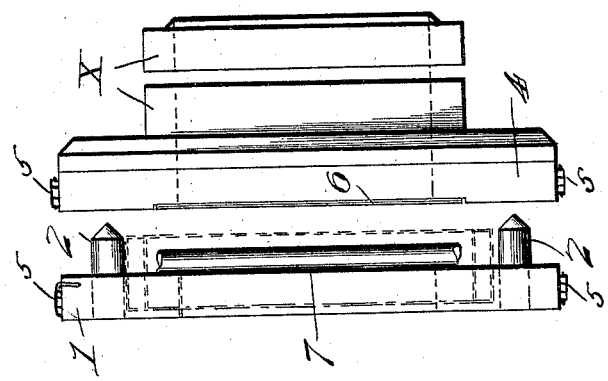
Fig. 2.
Fig. 1.
WITNESSES
INVENTOR
James W. Woolf
Attorney J. W. WOOLF.
MOLD FOR PLASTIC MATERIAL.
APPLICATION FILED AUG. 1, 1910.
1,049,436.
Patented Jan. 7, 1913.
3 SHEETS—SHEET 2.
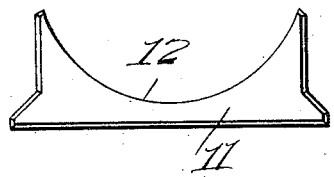
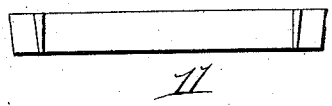
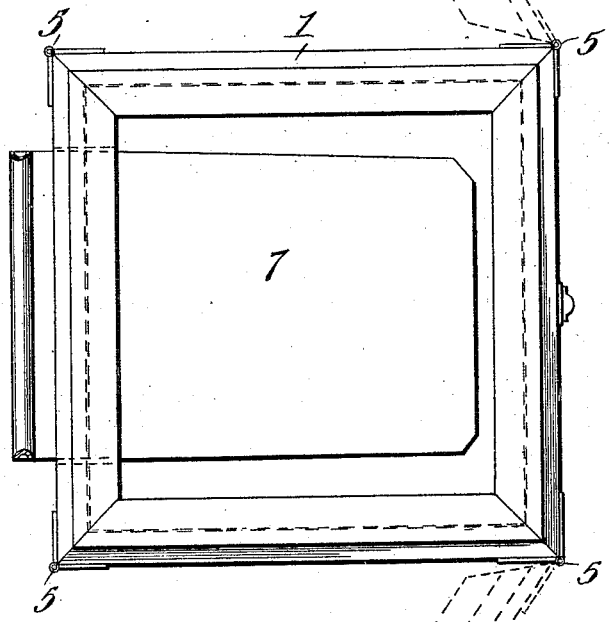
WITNESSES
INVENTOR
James W. Woolf
Attorney J. W. WOOLF.
MOLD FOR PLASTIC MATERIAL.
APPLICATION FILED AUG. 1, 1910.
1,049,436.
Patented Jan. 7, 1913.
3 SHEETS—SHEET 3.
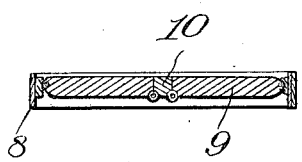
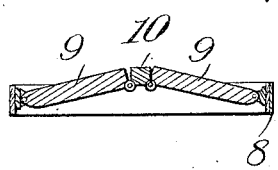
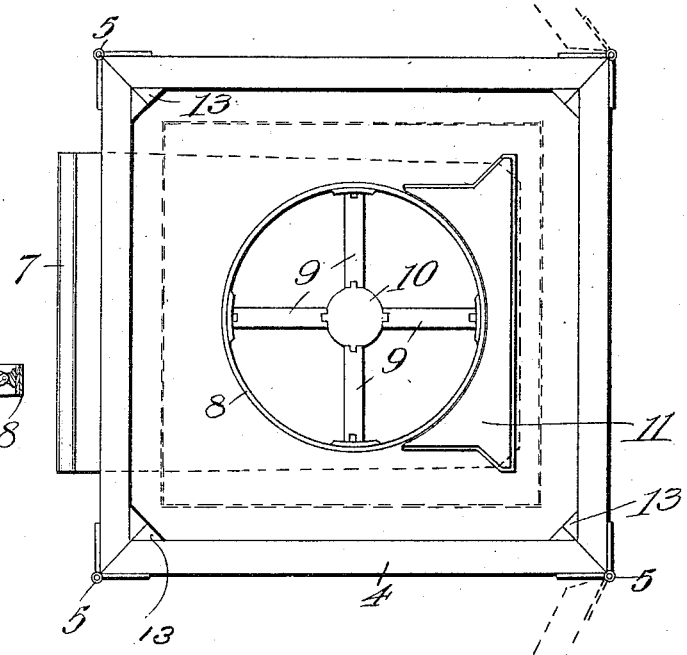
WITNESSES
INVENTOR
James W. Woolf
Attorney

UNITED STATES PATENT OFFICE.

JAMES W. WOOLF, OF TEMPE, ARIZONA.

MOLD FOR PLASTIC MATERIAL.

1,049,436. Specification of Letters Patent. Patented Jan. 7, 1913.

Application filed August 1, 1910. Serial No. 574,886.

*To all whom it may concern:*

Be it known that I, JAMES W. WOOLF, a citizen of the United States, residing at Tempe, in the county of Maricopa and State of Arizona, have invented new and useful Improvements in Molds for Plastic Material, of which the following is a specification.

The present invention relates to molds for plastic material, and more particularly to a structure of that character designed to mold water gates for conduits, and has for its purpose to provide an arrangement whereby the gate and tile shall be homogeneous and in one piece.

The further purpose of the invention is to provide a plastic water-gate molding, having means therein for the effective closing of the valve or shutter to prevent leakage; and wherein there is no possibility for the accumulation of sediment to interfere with the operation of said valve.

The invention further contemplates a mold of sectional type which is simple in its arrangement, durable and cheap to manufacture.

The invention is shown in its preferred structure in the accompanying drawing, wherein—

Figure 1 is a side elevation of the parts assembled. Fig. 2 is a similar view with the parts disassembled. Fig. 3 is a front elevation thereof. Fig. 4 is a view in elevation opposite to that shown in Fig. 3. Fig. 5 is a transverse sectional view of one section of the mold frame. Fig. 6 is a transverse sectional view of the core. Fig. 7 is a similar view showing the core contracted. Figs. 8 and 9 are respectively a top plan view and side elevation of the filler piece, and, Fig. 10 illustrates the molded structure.

Referring to the several figures in further detail, and with like characters of reference indicating corresponding parts in the different figures shown, 1 designates the base which is of substantially rectangular frame-like structure, and is provided with four dowel pins 2, rigidly secured thereon and designed to enter into apertures 3 of the frame 4 and hold the frames 1 and 4 in assembled relation. Each of the frames 1 and 4 is provided with hinges 5 whereby the sections of said frames may be separated in the manner indicated by dash lines in Figs. 3 and 4 for the purpose of removing the mold from the plastic setting. The upper frame section 4 is cut away as at 6, which, when the mold parts are assembled, forms a chamber to receive the die or gate forming member 7, the purpose of said member 7 being to mold within the plastic material the necessary space for the operation and seating of the valve or shutter, which is preferably of metallic structure.

To adapt the mold to form a water-gate homogeneous with the conduit there is provided an expansible core, comprising a circumferential expansible band 8, and a plurality of radially disposed links 9 connecting said band with the central piece or hub 10. The connection between the ring 8 and hub 10 is such that with moving the hub 10 axially in one direction effects to contact the band for the removal and insertion of the same and on its movement in the opposite direction said member 10 effects to distend or expand the band into its position for molding. Coöperating with the expansible core is a block or filler piece 11 whose design is that shown in Figs. 8 and 9. Said member 11 has an arcuate surface 12 which lies in intimate contact with a section of the expansible core in that manner shown in Fig. 4.

To give to the completed gate section a smooth and even finish, the frame section 4 is in cross section of that design shown in Fig. 5, and from which view it will be seen that the edges of the slab will be beveled as shown in Fig. 10. And to give to the corner edges of the gate structure a similar design, the molding frames are provided with blocks 13 whose position in the mold and function in the molding operation will be readily understood by reference to Fig. 4.

The several parts of the mold forms are interlocked in position for molding through the medium of suitable latches 14 and 15.

The pipe forming section of the mold is indicated by the reference character X.

What I claim as new is:—

A mold comprising a rectangular section providing a base; dowel pins rigidly mounted on said base adjacent the corners thereof; a second rectangular section mounted on said base and provided with apertures adapted to receive the dowel pins whereby to center said section on the base; hinges connecting the several sides of each of said sections whereby the sections may be opened and closed; said second section having a depression disposed adjacent the base section and providing a slideway, and said second section also having inclined surfaces to form a beveled edge on the molded article; a slide adapted to be removably fitted within said slideway; a circumferential expansible band providing a core and adapted to be located centrally of the mold sections; a hub for said band; links connecting said band with said hub to allow for contraction of the band and insertion when the hub is moved in one direction and to expand the same when moved in the reverse for molding; a supplemental block adapted to be removably fitted within the upper mold section, said block having an arcuate face complementary to and adapted to engage with said expansible band, said block also adapted to engage with the slide and form therewith a gateway in the molded article, and means for molding the pipe integral with said article, substantially as described.

In testimony whereof I have hereunto set my hand in presence of two subscribing witnesses.

JAMES W. WOOLF.

Witnesses:
J. F. Peck,
W. H. Wilbur.

Copies of this patent may be obtained for five cents each, by addressing the "Commissioner of Patents, Washington, D. C."